(12) United States Patent
Minefuji

(10) Patent No.: US 6,344,931 B1
(45) Date of Patent: Feb. 5, 2002

(54) ZOOM LENS SYSTEM

(75) Inventor: Nobutaka Minefuji, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/568,992

(22) Filed: May 11, 2000

(30) Foreign Application Priority Data

May 12, 1999 (JP) .......................................... 11-131303

(51) Int. Cl.$^7$ .............................................. G02B 15/14
(52) U.S. Cl. ...................................... 359/684; 359/690
(58) Field of Search ................................ 359/684, 690, 359/685, 686, 687, 683

(56) References Cited

U.S. PATENT DOCUMENTS

| | | | |
|---|---|---|---|
| 4,345,821 A | 8/1982 | Tachihara | 359/686 |
| 5,347,399 A | 9/1994 | Yoneyama et al. | 359/690 |
| 5,371,630 A | 12/1994 | Ito et al. | 359/688 |
| 5,543,969 A | 8/1996 | Ito | 359/690 |
| 5,912,771 A | 6/1999 | Ozaki et al. | 359/690 |

*Primary Examiner*—Georgia Epps
*Assistant Examiner*—David N. Spector
(74) *Attorney, Agent, or Firm*—Greenblum & Bernstein, P.L.C.

(57) ABSTRACT

A zoom lens system includes a positive first lens group, a negative second lens group, and a positive third lens group, in this order from the object. Zooming is performed by moving the second lens group and the third lens group, and the zoom lens system satisfies the following conditions:

$$0.0 < Fw/f1 < 0.15 \quad (1)$$

$$0.75 < |f2/f3| < 1.0 \quad (2)$$

$$1.65 < LD/Ft < 2.25 \quad (3)$$

wherein Fw designates the focal length of the entire lens system at the short focal length extremity; Ft designates the focal length of the entire lens system at the long focal length extremity; f1 designates the focal length of the first lens group; f2 designates the focal length of the second lens group; f3 designates the focal length of the third lens group; and LD designates the distance, at the short focal length extremity, from the most object-side surface of the first lens group to the most image-side surface of the third lens group.

6 Claims, 14 Drawing Sheets

1: 2.6

— d LINE
····· g LINE
– – – C LINE

−0.1    0.1
SPHERICAL
ABERRATION

CHROMATIC
ABERRATION

W=34.4°

−0.01    0.01
LATERAL
CHROMATIC
ABERRATION

W=34.4°

— S
– – M

−0.1    0.1
ASTIGMATISM

W=34.4°

−5.0 (%) 5.0
DISTORTION

1: 3.1

-0.1  0.1
SPHERICAL
ABERRATION

CHROMATIC
ABERRATION

— d LINE
---- g LINE
—--- C LINE

W=20.8°

-0.01  0.01
LATERAL
CHROMATIC
ABERRATION

W=20.8°

-0.1  0.1
ASTIGMATISM

— S
-- M

W=20.8°

-5.0 (%) 5.0
DISTORTION

1: 4.0

-0.1  0.1
SPHERICAL
ABERRATION

CHROMATIC
ABERRATION

— d LINE
---- g LINE
—--- C LINE

W=12.4°

-0.01  0.01
LATERAL
CHROMATIC
ABERRATION

W=12.4°

-0.1  0.1
ASTIGMATISM

— S
-- M

W=12.4°

-5.0 (%) 5.0
DISTORTION

Fig.7A
1: 3.3
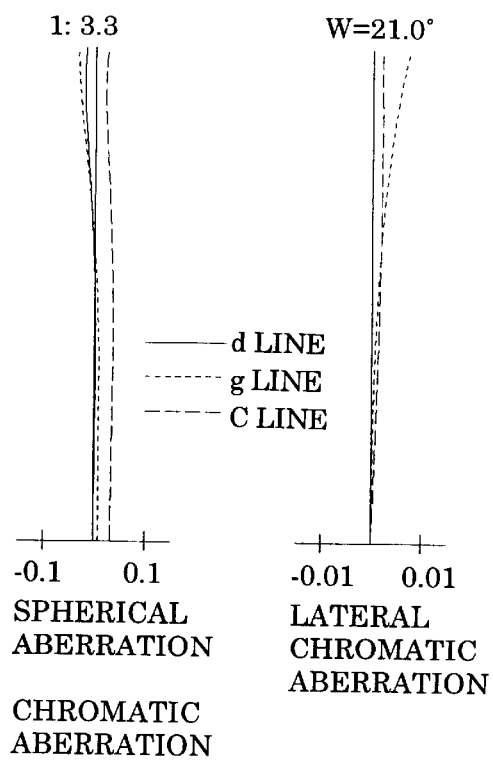
—— d LINE
----- g LINE
---- C LINE
-0.1   0.1
SPHERICAL
ABERRATION
CHROMATIC
ABERRATION
Fig.7B
W=21.0°
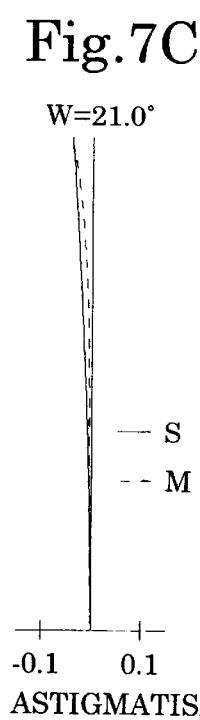
-0.01   0.01
LATERAL
CHROMATIC
ABERRATION
Fig.7C
W=21.0°
—— S
-- M
-0.1   0.1
ASTIGMATISM
Fig.7D
W=21.0°
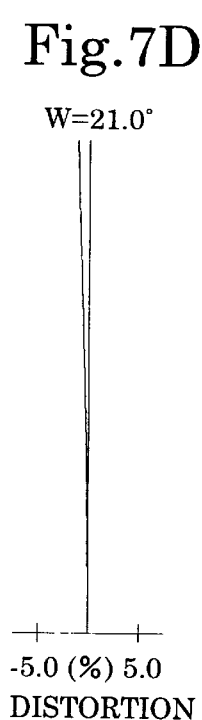
-5.0 (%) 5.0
DISTORTION
Fig.8A
1: 4.4
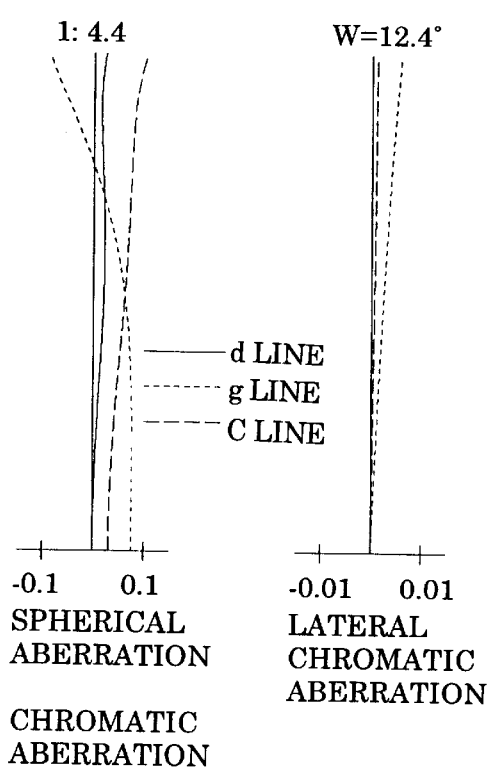
—— d LINE
----- g LINE
---- C LINE
-0.1   0.1
SPHERICAL
ABERRATION
CHROMATIC
ABERRATION
Fig.8B
W=12.4°
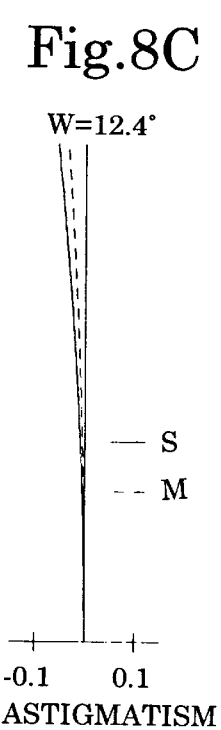
-0.01   0.01
LATERAL
CHROMATIC
ABERRATION
Fig.8C
W=12.4°
—— S
-- M
-0.1   0.1
ASTIGMATISM
Fig.8D
W=12.4°
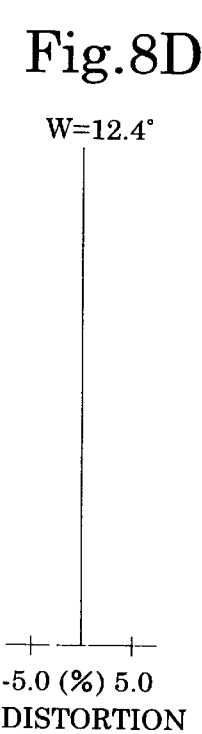
-5.0 (%) 5.0
DISTORTION

Fig.9
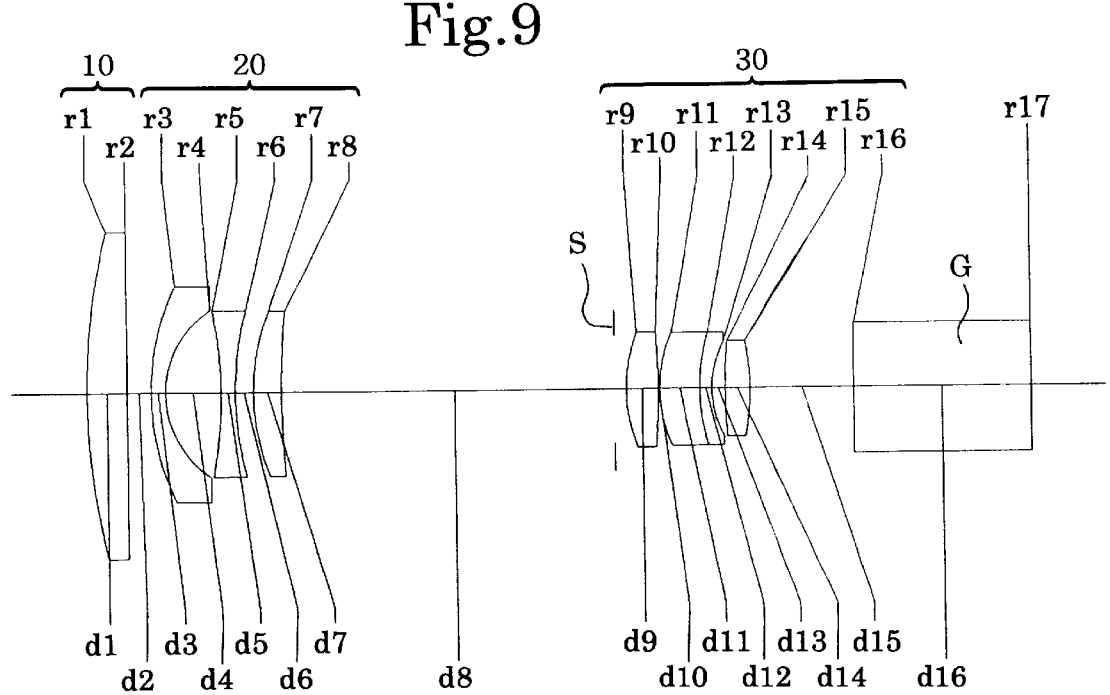
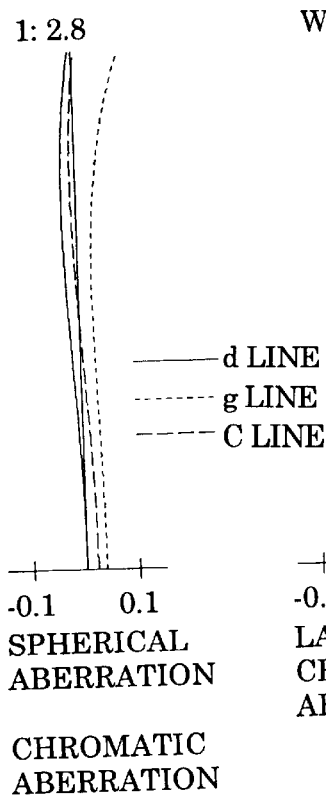
Fig.10A
1: 2.8
—— d LINE
······ g LINE
--- C LINE
-0.1  0.1
SPHERICAL
ABERRATION
CHROMATIC
ABERRATION
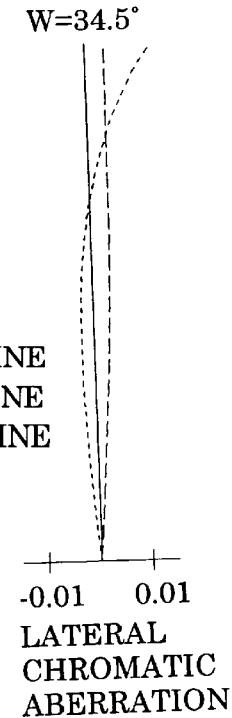
Fig.10B
W=34.5°
-0.01  0.01
LATERAL
CHROMATIC
ABERRATION
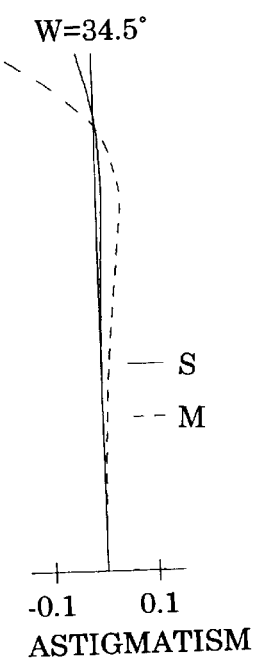
Fig.10C
W=34.5°
—— S
--- M
-0.1  0.1
ASTIGMATISM
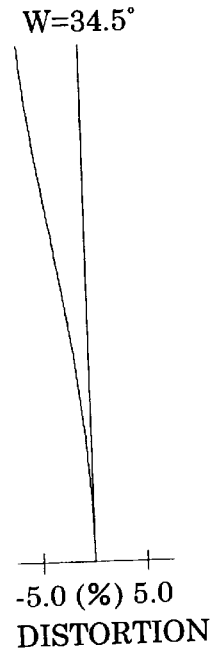
Fig.10D
W=34.5°
-5.0 (%) 5.0
DISTORTION

1: 3.5

-0.1  0.1
SPHERICAL
ABERRATION

CHROMATIC
ABERRATION

W=18.5°

-0.01  0.01
LATERAL
CHROMATIC
ABERRATION

W=18.5°

-0.1  0.1
ASTIGMATISM

W=18.5°

-5.0 (%) 5.0
DISTORTION

1: 5.2

-0.1  0.1
SPHERICAL
ABERRATION

CHROMATIC
ABERRATION

W=9.6°

-0.01  0.01
LATERAL
CHROMATIC
ABERRATION

W=9.6°

-0.1  0.1
ASTIGMATISM

W=9.6°

-5.0 (%) 5.0
DISTORTION

Fig. 14A — 1: 2.8 — SPHERICAL ABERRATION CHROMATIC ABERRATION — d LINE, g LINE, C LINE

Fig. 14B — W=34.4° — LATERAL CHROMATIC ABERRATION

Fig. 14C — W=34.4° — ASTIGMATISM — S, M

Fig. 14D — W=34.4° — DISTORTION

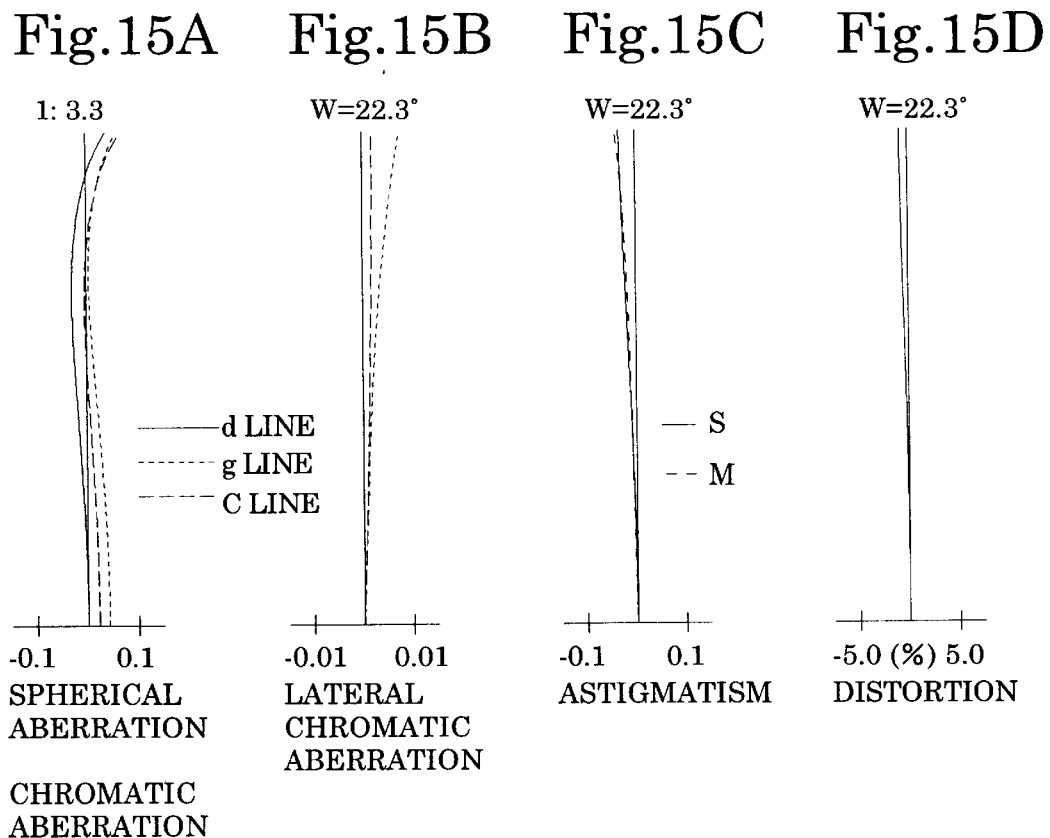
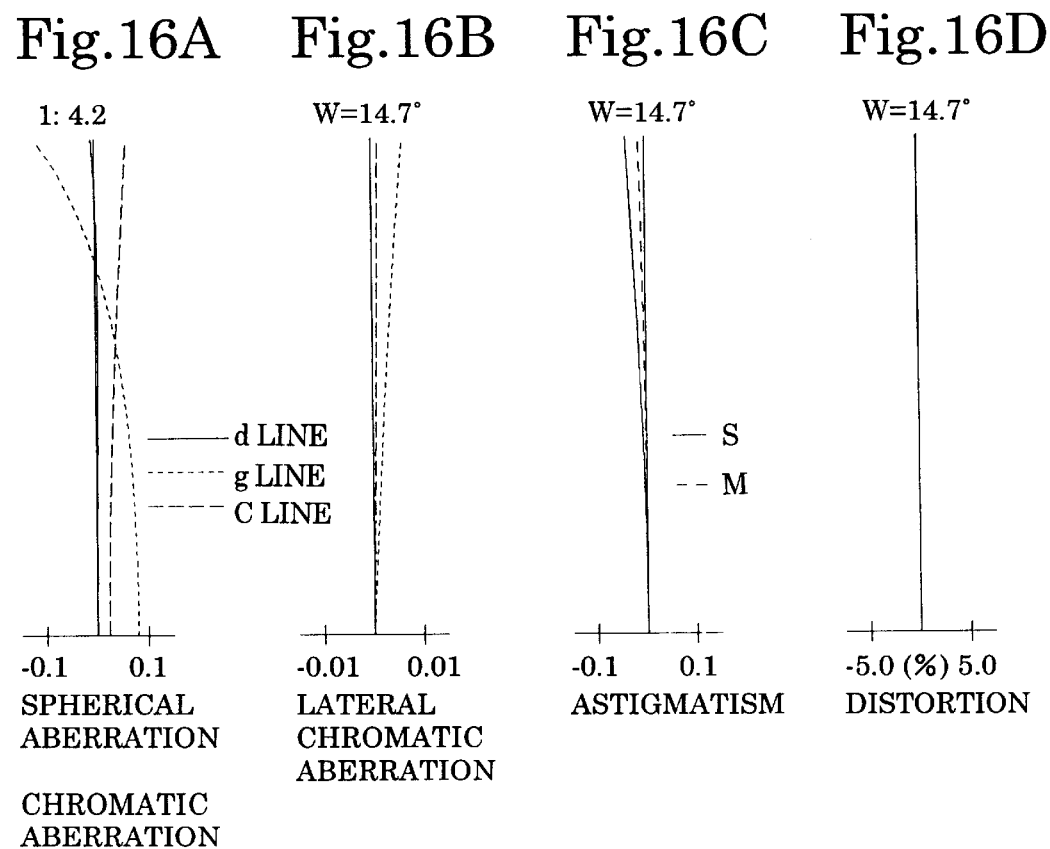

Fig.17
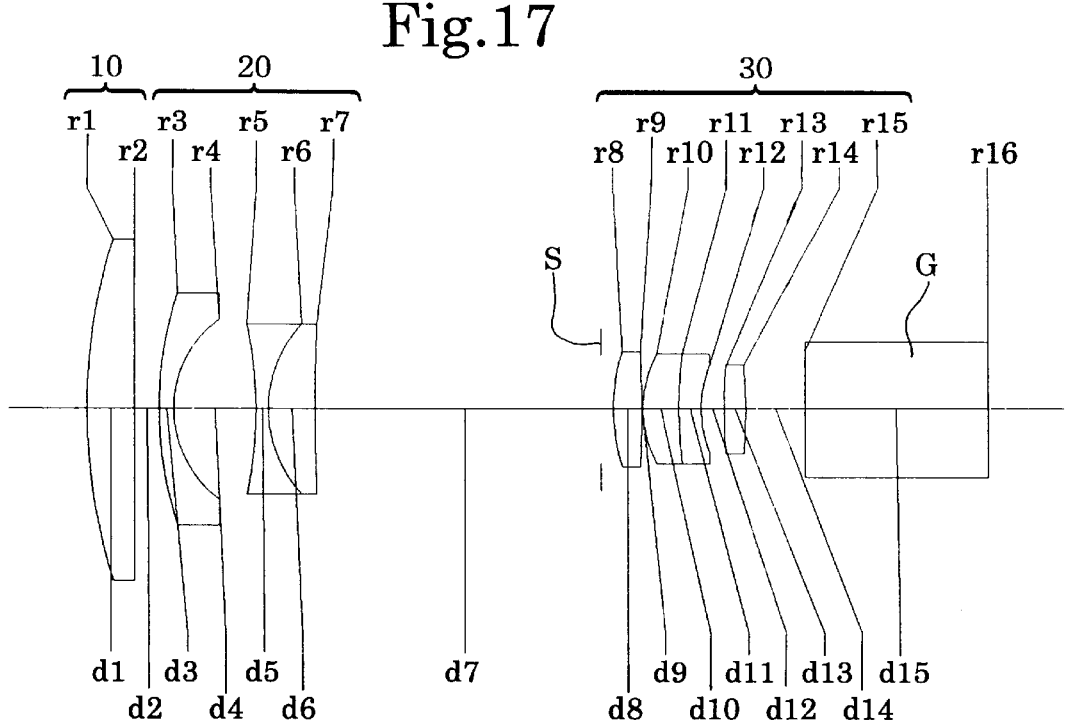
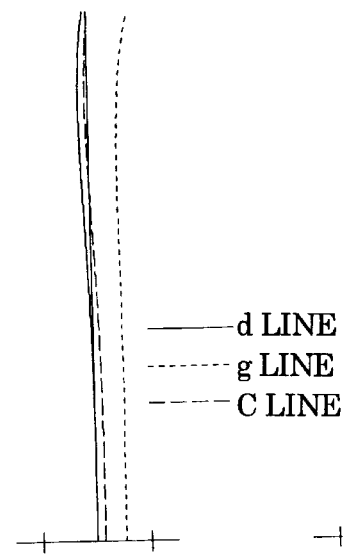
Fig.18A
1: 2.6
— d LINE
---- g LINE
--- C LINE
-0.1  0.1
SPHERICAL
ABERRATION
CHROMATIC
ABERRATION
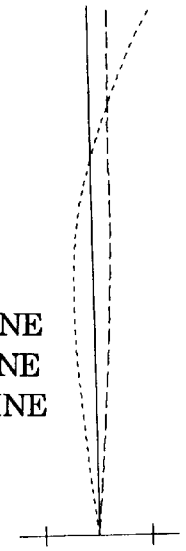
Fig.18B
W=34.4°
-0.01  0.01
LATERAL
CHROMATIC
ABERRATION
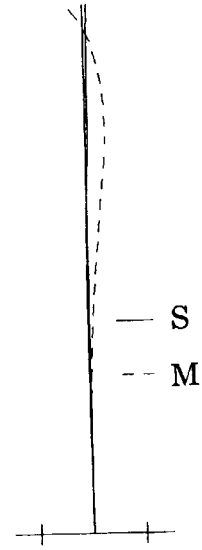
Fig.18C
W=34.4°
— S
-- M
-0.1  0.1
ASTIGMATISM
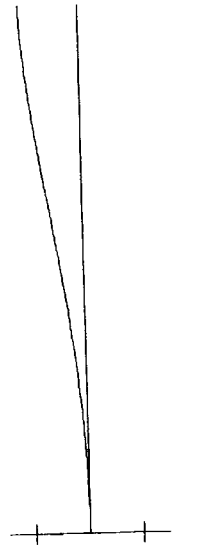
Fig.18D
W=34.4°
-5.0 (%) 5.0
DISTORTION

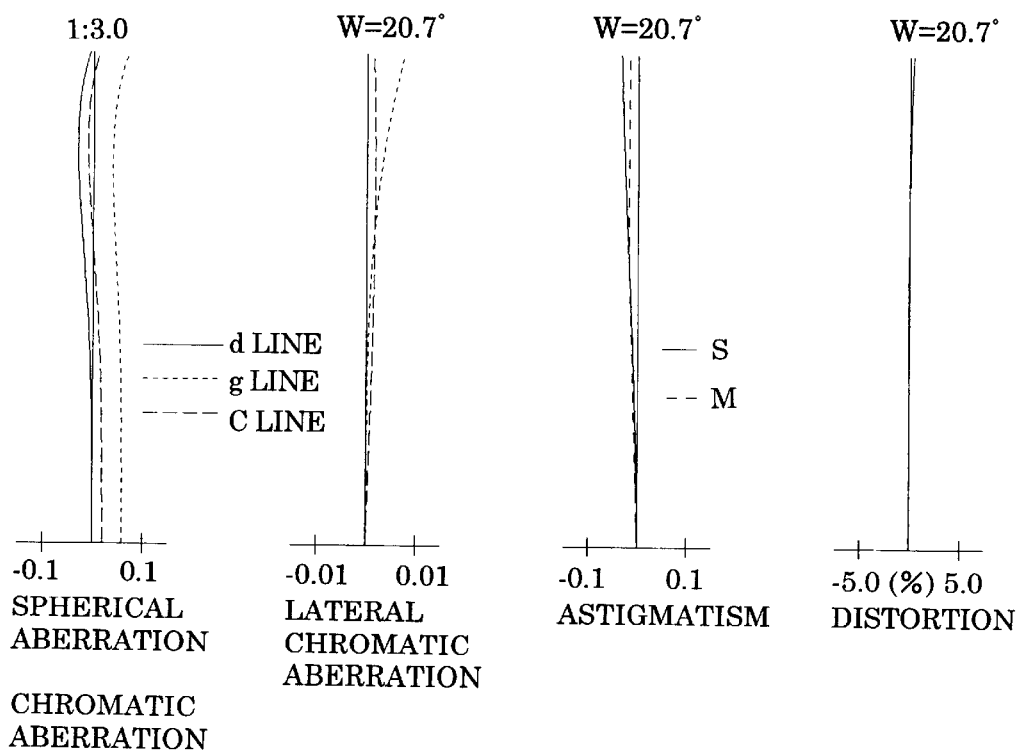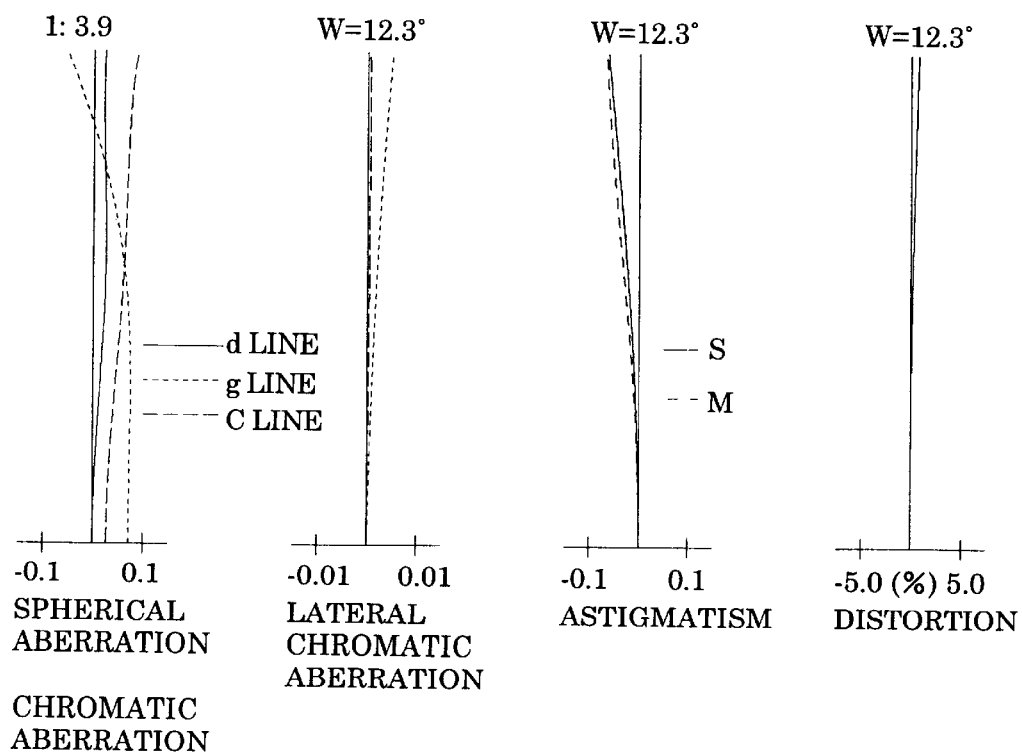

1: 2.6

— d LINE
······ g LINE
--- C LINE

-0.1    0.1
SPHERICAL
ABERRATION
CHROMATIC
ABERRATION

W=34.5°

-0.01    0.01
LATERAL
CHROMATIC
ABERRATION

W=34.5°

— S
--- M

-0.1    0.1
ASTIGMATISM

W=34.5°

-5.0 (%) 5.0
DISTORTION

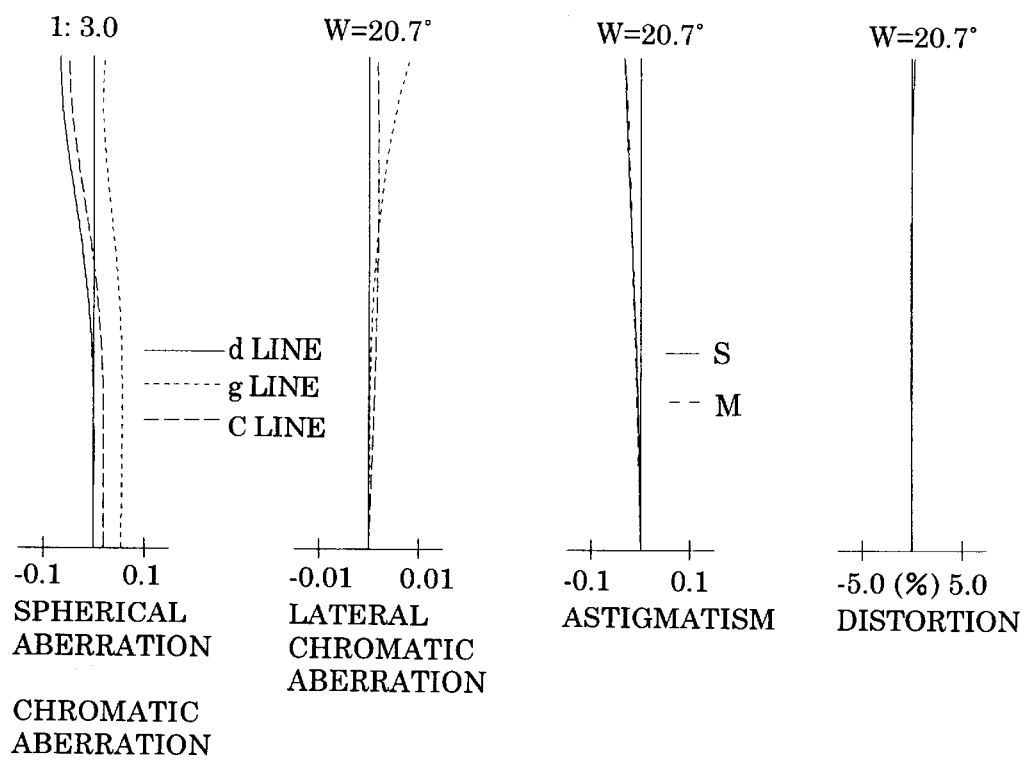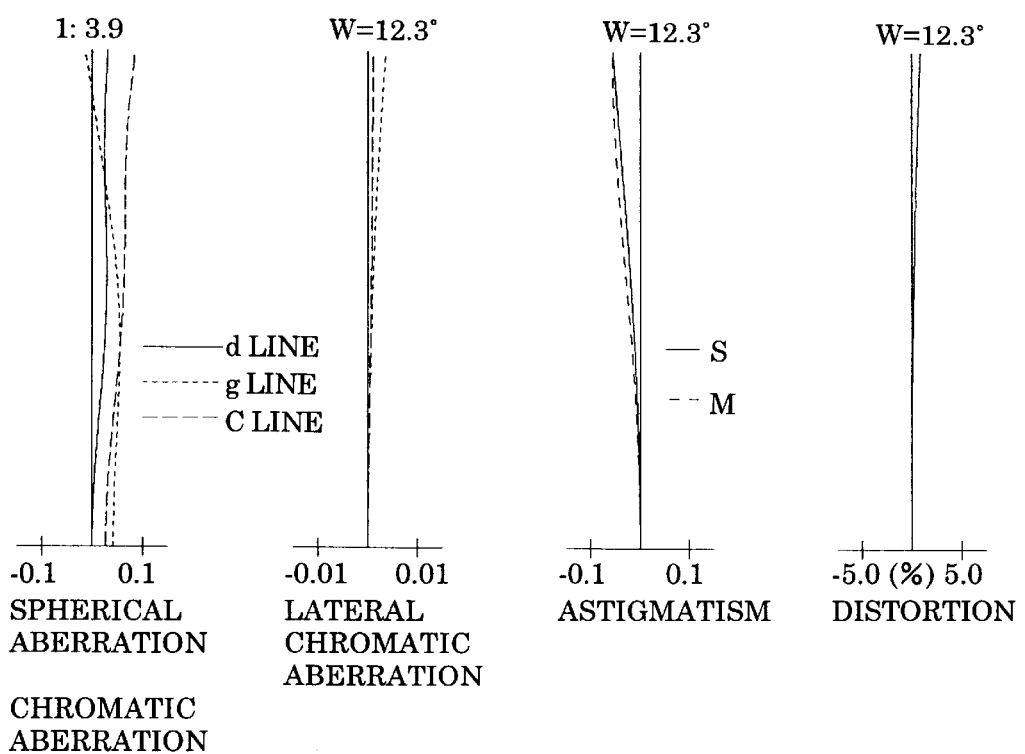

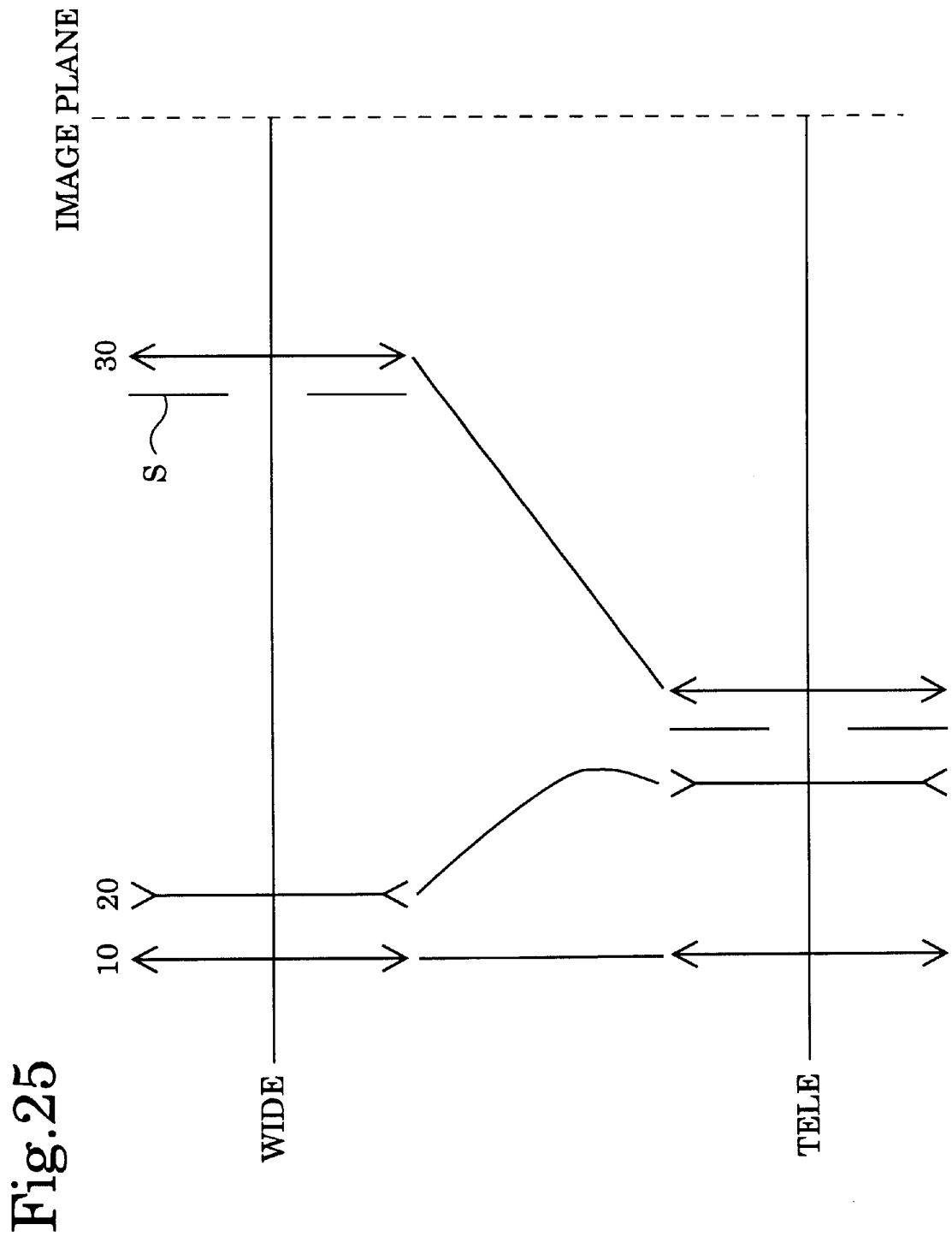

ZOOM LENS SYSTEM

BACKGROUND OF THE INVENTION

1. Field of the Invention

The present invention relates to zoom lens system which is used in video and digital cameras and the like having a high resolution.

2. Description of the Related Art

In recent years, along with demands for reducing the size of an image pick-up device and for increasing the density of pixels therein, a zoom lens system to be used in video and electronic still cameras and the like is also required to be smaller and to have an enhanced optical performance. In this regard, a conventional small-sized zoom lens system is known to have a two-lens-group arrangement which includes a negative first lens group and a positive second lens group, in this order from the object. However, if a zoom ratio exceeds 2, the power of each lens group becomes stronger, and thereby such a zoom lens system has difficulties in correcting various aberrations, and becomes more sensitive to even a minute manufacturing error of each lens element. Machining and assembling of lens elements therefore becomes more difficult.

As an attempt to solve the above problems, in the U.S. Pat. (hereinafter, U.S.P.) No. 5,543,969 and U.S. Pat. No. 5,912,771, a three-lens-group zoom lens system, which is constituted by a two-lens-group zoom lens system and a positive stationary lens group positioned on the object-side of the first lens group of the two-lens-group zoom lens system, is proposed, and thereby the three-lens-group zoom lens system attains a zoom ratio of about 3. The zoom lens system taught in U.S. Pat. No. 5,543,969 has a smaller F-number and a longer back focal distance; however, the overall length thereof is longer, and miniaturization thereof cannot be attained, since the number of the lens elements therein is large, and still further, at the short focal length extremity, a half angle-of-view is about 27°, which means that the focal length threat is not short enough. Furthermore, the zoom lens system taught in U.S. Pat. No. 5,912,771 has a small number of lens elements, and has a large half angle-of-view of about 30°; however, a back focal distance thereof is short. If the zoom lens system of U.S. Pat. No. 5,912,771 were used in a single lens reflex camera, it would be difficult to secure a space for a prism to bifurcate an optical path to the view finder.

SUMMARY OF THE INVENTION

It is an object of the present invention to provide a zoom lens system, having the following features, to be used in small-sized video and digital cameras and the like:

a zoom ratio of about 2.5 to 4.0;

a half angle-of-view of about 35° at the short focal length extremity;

an image-forming performance suitable for an image pick-up device having a high resolution;

a longer back focal distance; and a shorter overall length.

In order to achieve the above mentioned object, there is provided a zoom lens system which includes a positive first lens group, a negative second lens group, and a positive third lens group, in this order from the object. Zooming is performed by moving the second lens group and the third lens group, and the zoom lens system satisfies the following conditions:

$$0.0 < Fw/f1 < 0.15 \quad (1)$$
$$0.75 < |f2/f3| < 1.0 \quad (2)$$
$$1.65 < LD/Ft < 2.25 \quad (3)$$

wherein

Fw designates the focal length of the entire lens system at the short focal length extremity;

Ft designates the focal length of the entire lens system a the long focal length extremity;

f1 designates the focal length of the first lens group;

f2 designates the focal length of the second lens group;

f3 designates the focal length of the third lens group; and

LD designates the distance, at the short focal length extremity, from the most object-side surface of the first lens group to the most image-side surface of the third lens group.

The third lens group is a three-sub-lens-group lens system of four lens-elements. The sub-lens groups include a positive lens element, a cemented sub-lens group having a positive lens element and a negative lens element, and a positive lens element, in this order from the object. The third lens group preferably satisfies the following conditions:

$$0.5 < R1/R2 < 2.0 \quad (4)$$
$$N3 < 1.7 \quad (5)$$
$$v3 > 50 \quad (6)$$

wherein

R1 designates the radius of curvature of the object-side surface of the cemented sub-lens group in the third lens group;

R2 designates the radius of curvature of the image-side surface of the cemented sub-lens group in the third lens group;

N3 designates the averaged refractive index of the positive lens elements in the third lens group; and v3 designates the averaged Abbe number of the positive lens elements in the third lens group.

For the purpose of simplifying the third lens group and miniaturizing the entire lens system, it is preferable to provide, in the third lens group, a positive lens element having at least one aspherical surface on which a positive power is weakened according to an increase of a distance from the optical axis. Due to the aspherical surface, in particular, spherical aberration and coma can effectively be corrected, and the third lens group can be simplified. Furthermore, the entire lens system can be miniaturized while a suitable optical performance is maintained.

The second lens group is a three-sub-lens-group lens system of three lens elements. The sub-lens groups include a negative meniscus lens element having a convex surface facing toward the object, a negative biconcave lens element, and a positive lens element having a sharp convex surface facing toward the object, in this order from the object. The second lens group preferably satisfies the following condition:

$$0.4 < Rp/Rn < 1.0 \quad (7)$$

wherein

Rp designates the radius of curvature of the object-side surface of the positive lens element in the second lens group; and Rn designates the radius of curvature of the image-side surface of the negative biconcave lens element in the second lens group.

In the second lens group, the second lens element, i.e., the negative biconcave lens element, and the third lens element, i.e., the positive lens element having the sharp convex surface facing toward the object, can be cemented. When these two lens elements are cemented, a cemented sub-lens group preferably satisfies the following condition:

$$0.6<Fw/Rc<0.9 \qquad (8)$$

wherein

Rc designates the radius of curvature of the cemented surface of the cemented sub-lens group in the second lens group.

Furthermore, in the case where the second lens group is arranged to be a focusing lens group which is made moveable along the optical axis to obtain an in-focus state for the object, the second lens group preferably satisfies the following condition:

$$|(m2w-m2t)/m2w|<0.2 \qquad (9)$$

wherein m2w designates a transverse magnification, at the short focal length extremity, of the second lens group when the zoom lens system is focused at infinity; and m2t designates a transverse magnification, at the long focal length extremity, of the second lens group when the zoom lens system is focused at infinity.

The present disclosure relates to subject matter contained in Japanese Patent Application No. Hei-11-131303 (filed on May 12, 1999) which is expressly incorporated herein by reference in its entirety.

BRIEF DESCRIPTION OF THE DRAWINGS

The invention will be discussed below in detail with reference to the accompanying drawings, in which:

FIGS. 7A, 7B, 7C and 7D show aberration diagrams of the lens arrangement of FIG. 5 at an intermediate focal length;

FIGS. 8A, 8B, 8C and 8D show aberration diagrams of the lens arrangement of FIG. 5 at the long focal length extremity;

FIG. 9 is a lens arrangement of a third embodiment of a zoom lens system according to the present invention;

FIGS. 10A, 10B, 10C and 10D show aberration diagrams of the lens arrangement of FIG. 9 at the short focal length extremity;

FIGS. 14A, 14B, 14C and 14D show aberration diagrams of the lens arrangement of FIG. 13 at the short focal length extremity;

FIGS. 15A, 15B, 15C and 15D show aberration diagrams of the lens arrangement of FIG. 13 at an intermediate focal length;

FIGS. 16A, 16B, 16C and 16D show aberration diagrams of the lens arrangement of FIG. 13 at the long focal length extremity;

FIG. 17 is a lens arrangement of a fifth embodiment of a zoom lens system according to the present invention;

FIGS. 18A, 18B, 18C and 18D show aberration diagrams of the lens arrangement of FIG. 17 at the short focal length extremity;

FIGS. 19A, 19B, 19C and 19D show aberration diagrams of the lens arrangement of FIG. 17 at an intermediate focal length;

FIGS. 20A, 20B, 20C and 20D show aberration diagrams of the lens arrangement of FIG. 17 at the long focal length extremity;

FIGS. 23A, 23B, 23C and 23D show aberration diagrams of the lens arrangement of FIG. 21 at an intermediate focal length;

FIGS. 24A, 24B, 24C and 24D show aberration diagrams of the lens arrangement of FIG. 21 at the long focal length extremity;

FIG. 25 is a diagram showing the lens-group moving paths of a zoom lens system according to the first through fourth embodiments of the present invention.

DESCRIPTION OF THE PREFERRED EMBODIMENTS

Figure 26:
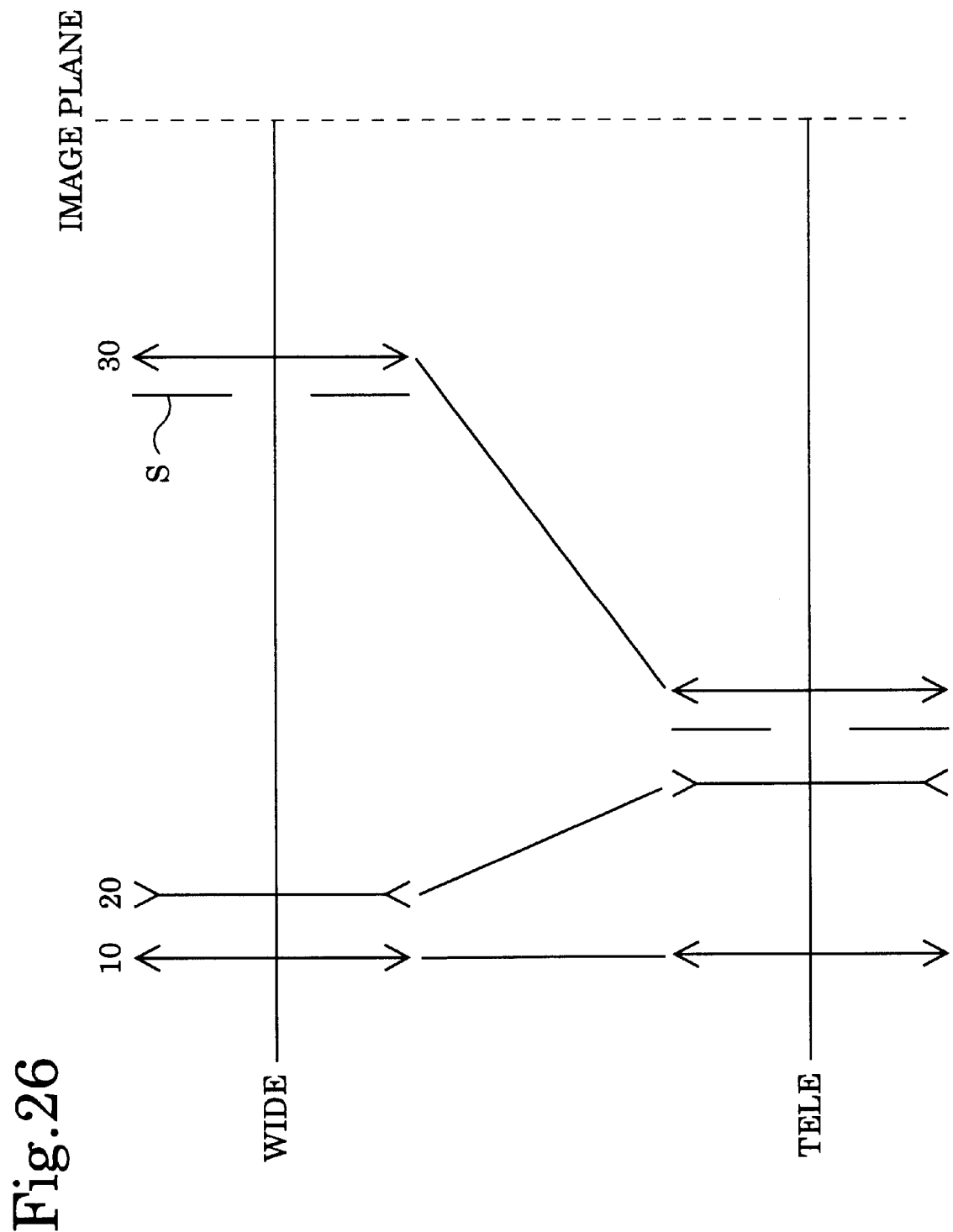
FIG. 26 is a diagram showing the lens-group moving paths of a zoom lens system according to the fifth and sixth embodiments of the present invention.

The zoom lens system according to the present invention, as shown in FIGS. 25 and 26, includes a positive first lens group 10, a negative second lens group 20, a diaphragm S, and a positive third lens group 30, in this order from the object. In this zoom lens system, the first lens group 10 is stationary, and zooming is performed by moving the second lens group 20 and the third lens group 30. According to these figures, upon zooming from the short focal length extremity toward the long focal length extremity, the second lens group 20 moves toward the image from the short focal length extremity over an intermediate focal length, or monotonously moves toward the image; on the other hand, the third lens group 30 moves toward the object. The diaphragm S is provided between the second lens group 20 and the third lens group 30, and moves integrally with the third lens group 30.

Condition (1) specifies a power of the first lens group 10.

If Fw/f1 exceeds the upper limit of condition (1), the power of the first lens group 10 becomes too strong, and the negative power of the second lens group 20 becomes stronger accordingly. As a result, fluctuation of aberrations upon zooming cannot be reduced.

If the power of the first lens group 10 becomes too weak to the extent that Fw/f1 exceeds the lower limit of condition (1), the diameter of the second lens group 20 undesirably increases.

Condition (2) specifies a power-ratio of the second lens group 20 to the third lens group 30.

If |f2/f3| exceeds the upper limit of condition (2), the negative power of the second lens group 20 becomes weaker, and the positive power of the third lens group 30 becomes stronger. As a result, a back focal distance cannot be maintained longer.

If the negative power of the second lens group 20 becomes too stronger to the extent that |f2/f3| exceeds the lower limit of condition (2), fluctuation of aberrations upon zooming undesirably becomes larger.

Condition (3) specifies an overall length of the lens system at the short focal length extremity.

If the entire length becomes longer to the extent that LD/Ft exceeds the upper limit of condition (3), the diameter of the first lens group 10 becomes larger, which is undesirable from the viewpoint of miniaturization of the lens system.

If the overall length becomes too short to the extent that LD/Ft exceeds the lower limit of condition (3), the power of each lens group becomes stronger, so that it is difficult for the lens groups to correct aberrations in an well-balanced manner.

Condition (4) specifies a configuration of the cemented sub-lens group in the third lens group 30. By satisfying this condition, fluctuation of spherical aberration can be reduced, while chromatic aberration can suitably be maintained.

If the power of the image-side concave surface of the cemented sub-lens group becomes too strong to the extent that R1/R2 exceeds the upper limit of condition (4), spherical aberration is undesirably overcorrected.

If the power of the image-side concave surface of the cemented sub-lens group becomes too weak to the extent that R1/R2 exceeds the lower limit of condition (4), spherical aberration is undercorrected.

Condition (5) specifies a refractive index of the positive lens elements in the third lens group 30. Since the second lens group 20 has a strong negative power, the Petzval sum of the entire lens system tends to be negative. In order to make the negative Petzval sum smaller, a refractive index of the positive lens elements having a strong positive power is preferably determined to be smaller.

If the refractive index is larger to the extent that N3 exceeds the upper limit of condition (5), the Petzval sum of the entire lens system is overcorrected. As a result, the sagittal image plane inclines in the positive direction, and astigmatic difference undesirably becomes longer.

Condition (6) specifies the Abbe number of the positive lens elements in the third lens group 30 so that chromatic aberration can adequately be corrected.

If lens materials are selected within the range of condition (6), in particular, lateral chromatic aberration at the short focal length extremity, and axial chromatic aberration at the long focal length extremity can be corrected in an well-balanced manner.

Condition (7) relates to the second lens group 20, and specifies configurations of the second lens element (negative biconcave lens element) and the third lens element (positive lens element) under the condition that the second lens group includes the negative meniscus lens element having the convex surface facing toward the object, the negative biconcave lens element, and the positive lens element having the sharp convex surface facing toward the object, in this order from the object.

If Rp/Rn exceeds the upper or lower limit of condition (7), it is difficult to suitably correct spherical aberration and coma.

In the second lens group, by forming the second lens element and the third lens element as a cemented sub-lens group, simplification on assembly work can be attained without causing optical-performance deterioration due to errors occurred in a machining process.

Condition (8) specifies a configuration of the cemented surface of the second and third lens elements under the condition that these two lens elements are formed as the cemented sub-lens group.

If the radius of curvature of the cemented surface becomes too small to the extent that Fw/Rc exceeds the upper limit of condition (8), the concavity (convexity) of the cemented surface undesirably becomes too deep (too sharp).

If the radius of curvature of the cemented surface becomes too large to the extent that Fw/Rc exceeds the lower limit of condition (8), it is difficult to correct chromatic aberration without deteriorating spherical aberration.

Condition (9) specifies a zooming function of the second lens group 20. Focusing is preferably performed by the second lens group 20 having a strong power. However, if the second lens group 20 is arranged to perform focusing, advancing distances, upon photographing a closer object, for focusing are different at each focal length. As a result, if zooming is performed when a camera-to-object distance is shorter, a focal point is undesirably shifted.

By satisfying condition (9), an advancing distance at each focal length can be made shorter, so that the above undesirable shift can be made shorter.

Specific numerical examples will herein be discussed. In the diagrams of chromatic aberration (axial chromatic aberration) represented by spherical aberration, the solid lines and the two types of dotted lines respectively indicate spherical aberration with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. In the tables, $F_{NO}$ designates the F-number, f designates the focal length of the entire lens system, W designates the half angle-of-view (°), $f_B$ designates the back focal distance (the equivalent air thickness, along the optical axis, from the most image-side lens surface to an image pick-up surface), r designates the radius of curvature, d designates the lens thickness or space between lens surfaces, $N_d$ designates the refractive index of the d-line (wavelength: 588 nm), and v designates the Abbe number.

In addition to the above, an aspherical surface which is symmetrical with respect to the optical axis is defined as follows:

$$x=Ch^2/\{1+[1-(1+K)C^2h^2]^{1/2}\}+A4h^4+A6h^6+A8h^8+A10h^{10};$$

wherein:
 x designates a distance from a tangent plane of an aspherical vertex;
 C designates a curvature of the aspherical vertex (1/R);

h designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

In addition, a plane-parallel plate G is constituted by filters and a prism for bifurcating an optical path to the view finder and the like.

[Embodiment 1]

Figure 1:
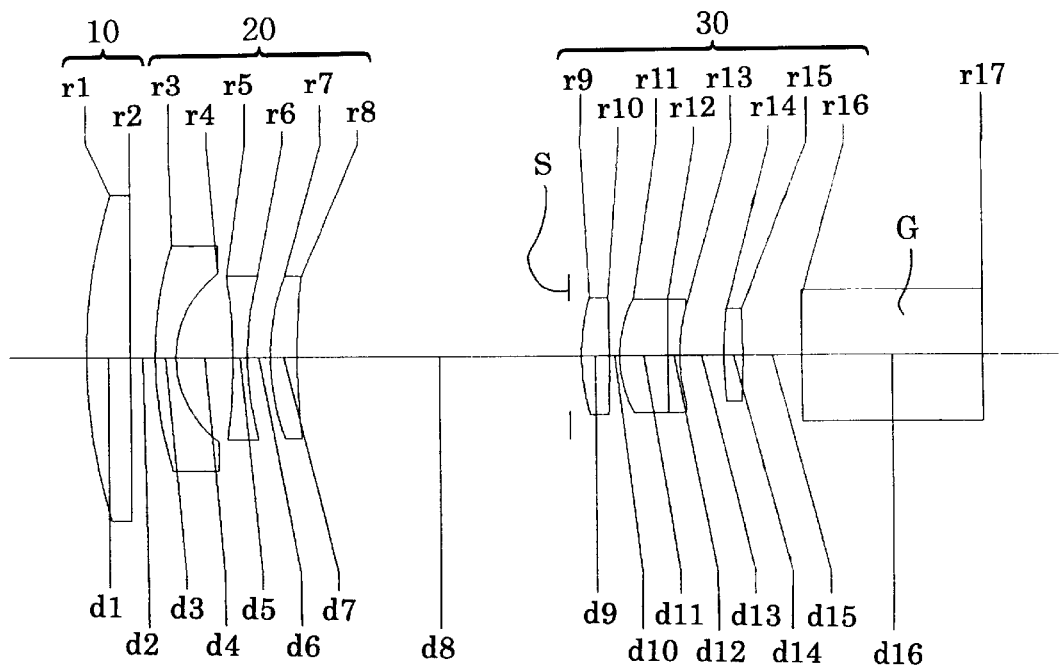
FIG. 1 is a lens arrangement of a first embodiment of a zoom lens system according to the present invention.
Figure 2A:
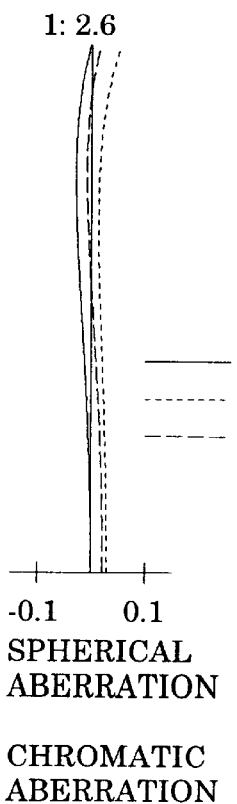
FIGS. 2A, 2B, 2C and 2D show aberration diagrams of the lens arrangement of FIG. 1 at the short focal length extremity.
Figure 2B:
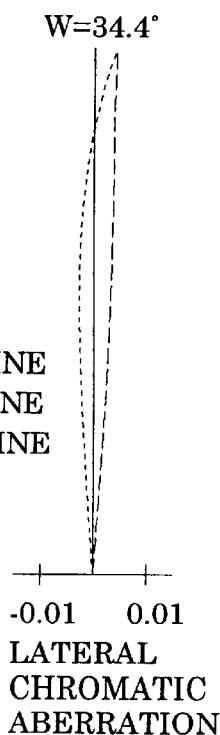
Figure 2C:
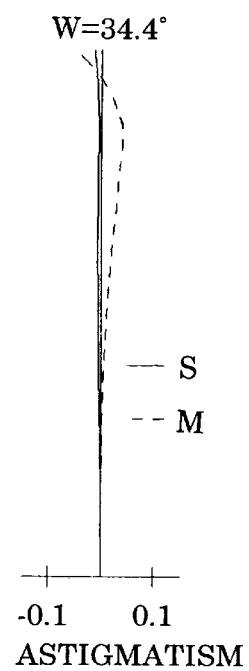
Figure 2D:
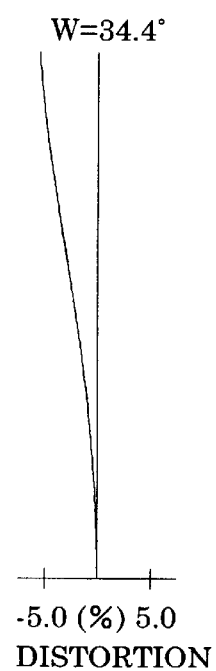
Figure 3A:
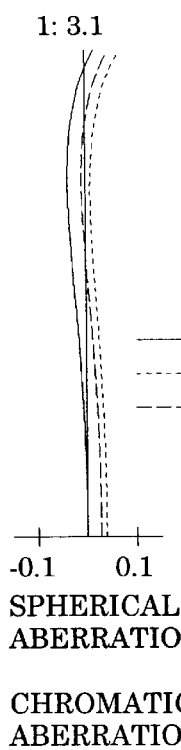
FIGS. 3A, 3B, 3C and 3D show aberration diagrams of the lens arrangement of FIG. 1 at an intermediate focal length.
Figure 3B:
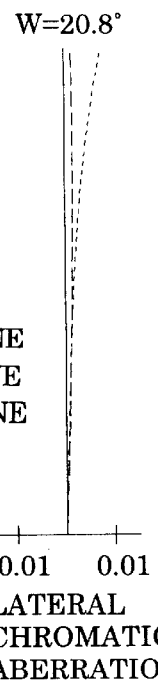
Figure 3C:
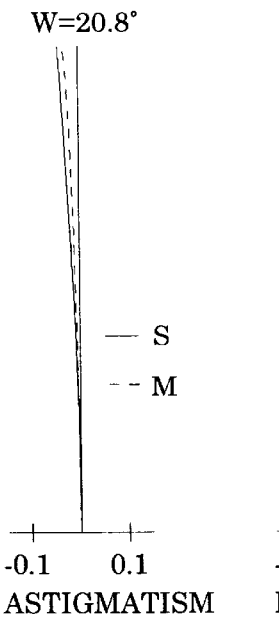
Figure 3D:
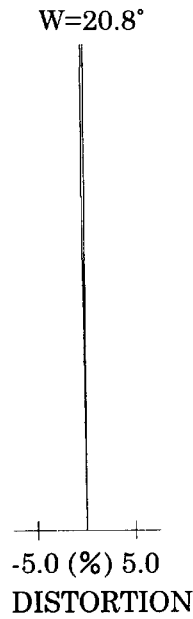
Figure 4A:
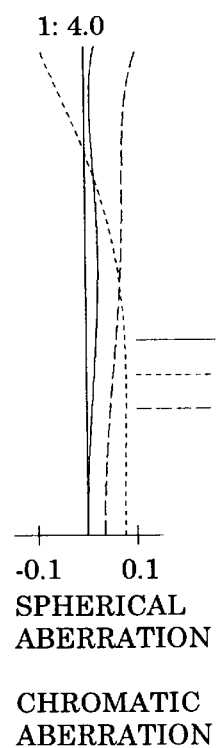
FIGS. 4A, 4B, 4C and 4D show aberration diagrams of the lens arrangement of FIG. 1 at the long focal length extremity.
Figure 4B:
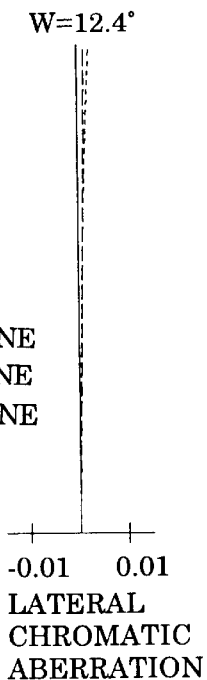
Figure 4C:
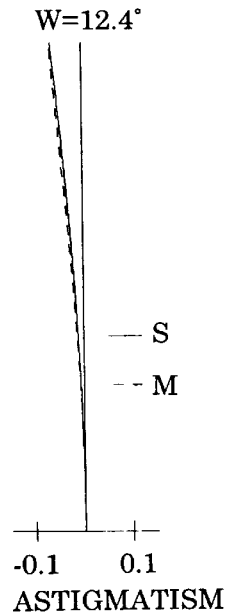
Figure 4D:
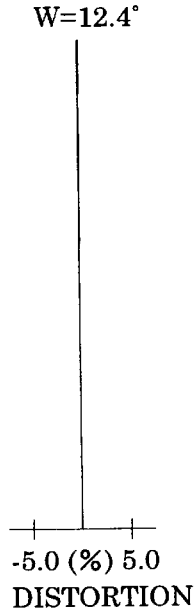

FIG. 1 is a lens arrangement of the first embodiment of a zoom lens system according to the present invention. FIGS. 2A through 2D show aberration diagrams of the lens arrangement of FIG. 1 at the short focal length extremity. FIGS. 3A through 3D show aberration diagrams of the lens arrangement of FIG. 1 at an intermediate focal length. FIGS. 4A through 4D show aberration diagrams of the lens arrangement of FIG. 1 at the long focal length extremity. Table 1 shows the numerical data thereof. The first lens group 10 is constituted by a positive single lens element. The second lens group 20 is a three-sub-lens-group lens system of three lens-elements. The second group 20 is constituted by a negative meniscus lens element having a convex surface facing toward the object, a negative biconcave lens element, and a positive lens element having a sharp convex surface facing toward the object, in this order from the object. The third lens group 30 is a three-sub-lens-group lens system of four lens-elements. The third lens group is constituted by a positive lens element, a cemented sub-lens group having a positive lens element and a negative lens element, and a positive lens element, in this order from the object. In the third lens group 30, on the object-side surface of the most image-side positive lens element, an aspherical surface, on which a positive power is weakened according to an increase of a distance from the optical axis, is formed.

TABLE 1

$F_{NO}$ = 1:2.6-3.1-4.0
f = 8.50-14.50-25.00 (Zoom Ratio: 2.94)
W = 34.4-20.8-12.4
$f_B$ = 14.83-19.46-29.16 (= (4.94-9.57-19.27) + (15.00/1.51633))

| Surface No. | r | d | Nd | ν |
|---|---|---|---|---|
| 1 | 47.940 | 3.58 | 1.48749 | 70.2 |
| 2 | ∞ | 2.00-9.06-8.18 | — | — |
| 3 | 32.564 | 1.70 | 1.77250 | 49.6 |
| 4 | 8.816 | 4.66 | — | — |
| 5 | −48.057 | 1.20 | 1.77250 | 49.6 |
| 6 | 26.292 | 1.87 | — | — |
| 7 | 19.503 | 2.22 | 1.84666 | 23.8 |
| 8 | 65.791 | 22.51-10.81-2.00 | — | — |
| Diaphragm | ∞ | 1.00 | — | — |
| 9 | 17.550 | 2.28 | 1.69680 | 55.5 |
| 10 | −144.569 | 0.87 | — | — |
| 11 | 10.563 | 3.97 | 1.48749 | 70.2 |
| 12 | 8301.901 | 1.00 | 1.84666 | 23.8 |
| 13 | 14.491 | 3.68 | — | — |
| 14* | 31.587 | 1.58 | 1.58913 | 61.2 |
| 15 | −72.123 | 4.94-9.57-19.27 | — | — |
| 16 | ∞ | 15.00 | 1.51633 | 64.1 |
| 17 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 14 | 0.00 | −0.2245 × 10$^{-3}$ | −0.1212 × 10$^{-5}$ | −0.3709 × 10$^{-7}$ |

[Embodiment 2]

Figure 5:
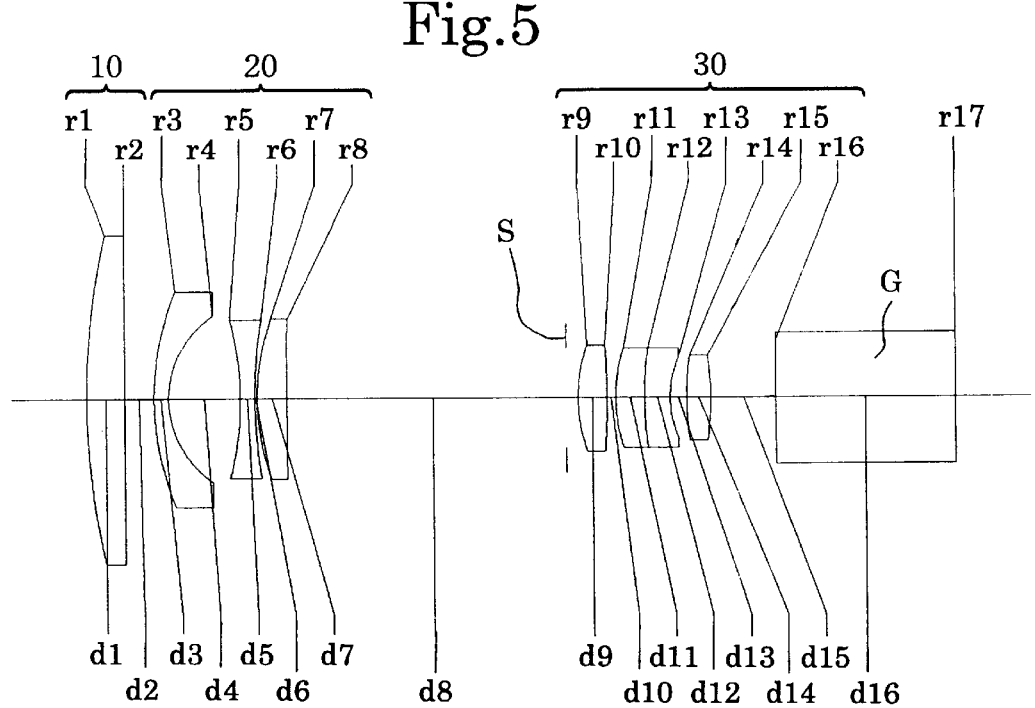
FIG. 5 is a lens arrangement of a second embodiment of a zoom lens system according to the present invention.
Figure 6A:
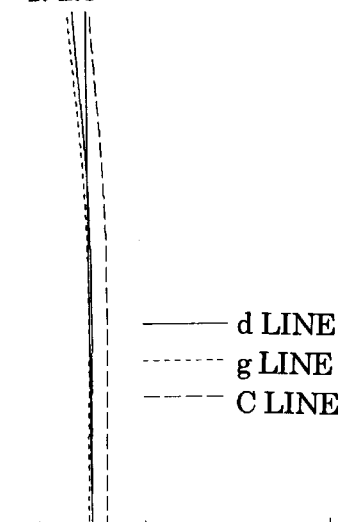
FIGS. 6A, 6B, 6C and 6D show aberration diagrams of the lens arrangement of FIG. 5 at the short focal length extremity.
Figure 6B:
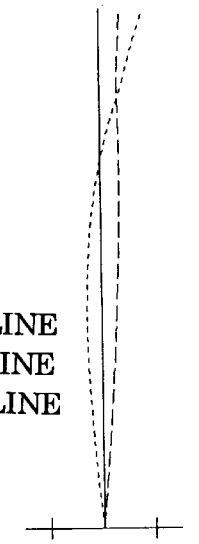
Figure 6C:
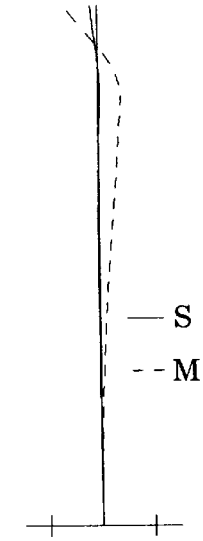
Figure 6D:
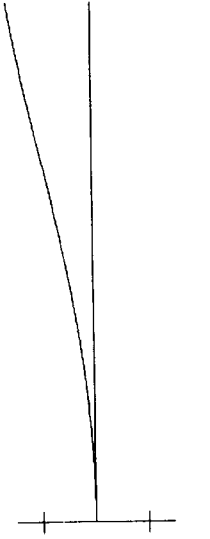
Figure 11A:
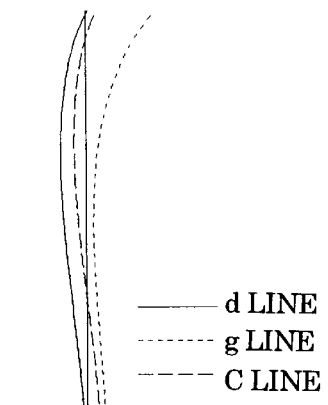
FIGS. 11A, 11B, 11C and 11D show aberration diagrams of the lens arrangement of FIG. 9 at an intermediate focal length.
Figure 11B:
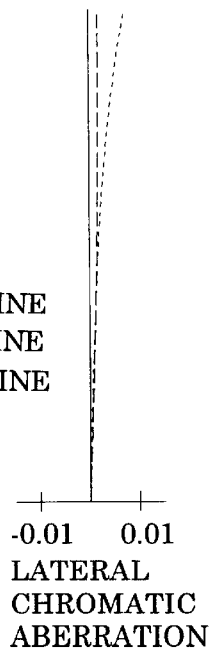
Figure 11C:
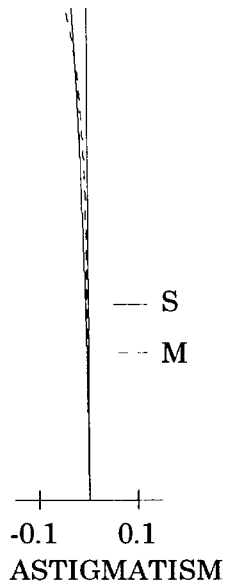
Figure 11D:
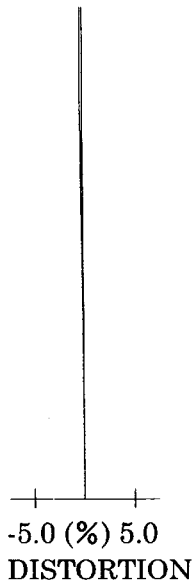
Figure 12A:
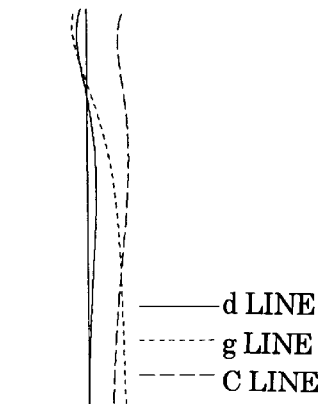
FIGS. 12A, 12B, 12C and 12D show aberration diagrams of the lens arrangement of FIG. 9 at the long focal length extremity.
Figure 12B:
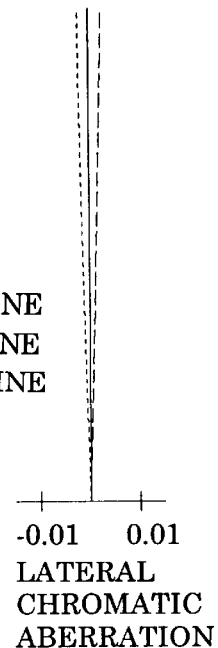
Figure 12C:
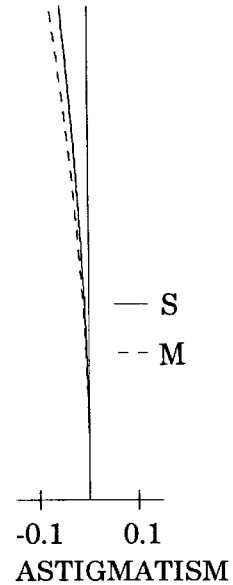
Figure 12D:
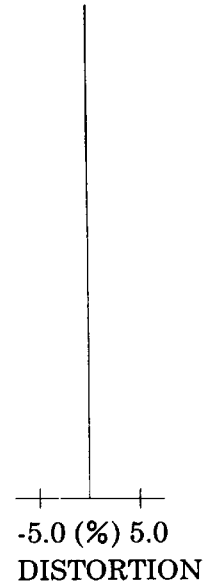

FIG. 5 is a lens arrangement of the second embodiment of a zoom lens system according to the present invention. FIGS. 6A through 6D show aberration diagrams of the lens arrangement of FIG. 5 at the short focal length extremity. FIGS. 7A through 7D show aberration diagrams of the lens arrangement of FIG. 5 at an intermediate focal length. FIGS. 8A through 8D show aberration diagrams of the lens arrangement of FIG. 5 at the long focal length extremity. Table 2 shows the numerical data thereof. The basic lens arrangement is the same as the first embodiment. In the third lens group 30, on the object-side surface of the most object-side positive lens element, an aspherical surface, on which a positive power is weakened according to an increase of a distance from the optical axis, is formed.

TABLE 2

$F_{NO}$ = 1:2.8-3.8-4.4
f = 8.50-14.50-25.00 (Zoom Ratio: 2.94)
W = 35.1-21.0-12.4
$f_B$ = 15.33-19.95-29.11 (= (5.44-10.06-19.22) + (15.00/1.51633))

| Surface No. | r | d | Nd | ν |
|---|---|---|---|---|
| 1 | 62.395 | 3.17 | 1.48749 | 70.2 |
| 2 | ∞ | 2.40-9.77-9.11 | — | — |
| 3 | 23.741 | 1.20 | 1.83481 | 42.7 |
| 4 | 8.548 | 5.94 | — | — |
| 5 | −26.772 | 1.20 | 1.80400 | 46.6 |
| 6 | 42.456 | 0.20 | — | — |
| 7 | 20.447 | 2.44 | 1.84666 | 23.8 |
| 8 | 856.748 | 23.39-11.41-2.90 | — | — |
| Diaphragm | ∞ | 1.00 | — | — |
| 9* | 13.191 | 2.41 | 1.69680 | 55.5 |
| 10 | −62.733 | 0.71 | — | — |
| 11 | 13.459 | 2.46 | 1.48749 | 70.2 |
| 12 | 35.595 | 2.12 | 1.80518 | 25.4 |
| 13 | 8.241 | 1.40 | — | — |
| 14 | 25.118 | 2.01 | 1.48749 | 70.2 |
| 15 | −22.632 | 5.44-10.06-19.22 | — | — |
| 16 | ∞ | 15.00 | 1.51633 | 64.1 |
| 17 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 9 | 0.00 | −0.7645 × 10$^{-4}$ | 0.5543 × 10$^{-8}$ | −0.3871 × 10$^{-8}$ |

[Embodiment 3]

FIG. 9 is a lens arrangement of the third embodiment of a zoom lens system according to the present invention. FIGS. 10A through 10D show aberration diagrams of the lens arrangement of FIG. 9 at the short focal length extremity. FIGS. 11A through 11D show aberration diagrams of the lens arrangement of FIG. 9 at an intermediate focal length. FIGS. 12A through 12D show aberration diagrams of the lens arrangement of FIG. 9 at the long focal length extremity. Table 3 shows the numerical data thereof. The basic lens arrangement is the same as the first embodiment. In the third lens group 30, on the object-side surfaces of both the most object-side and image-side positive lens elements, aspherical surfaces, on which a positive power is weakened according to an increase of a distance from the optical axis, are formed. Due to this arrangement, a zoom ratio can be increased to 3.8.

TABLE 3

$F_{NO}$ = 1:2.8-3.5-5.2
f = 8.50–16.50-32.50 (Zoom Ratio: 3.82)
W = 34.5-18.5-9.6
$f_B$ = 18.61-25.02-41.32 (= (8.72-15.13-31.43) + (15.00/1.51633))

| Surface No. | r | d | Nd | ν |
|---|---|---|---|---|
| 1 | 58.024 | 3.34 | 1.48749 | 70.2 |
| 2 | ∞ | 2.00-11.37-5.67 | — | — |
| 3 | 21.621 | 1.20 | 1.80400 | 46.6 |
| 4 | 8.642 | 4.60 | — | — |
| 5 | -37.411 | 1.20 | 1.78650 | 50.0 |
| 6 | 26.915 | 1.51 | — | — |
| 7 | 19.048 | 2.35 | 1.84666 | 23.8 |
| 8 | 77.188 | 28.07-12.29-1.70 | — | — |
| Diaphragm | ∞ | 1.00 | — | — |
| 9* | 12.432 | 2.71 | 1.48749 | 70.2 |
| 10 | -57.067 | 0.12 | — | — |
| 11 | 11.653 | 3.42 | 1.48749 | 70.2 |
| 12 | 16.341 | 1.00 | 1.84666 | 23.8 |
| 13 | 8.204 | 1.13 | — | — |
| 14* | 47.025 | 2.09 | 1.58913 | 61.2 |
| 15 | -20.415 | 8.72-15.13-31.43 | — | — |
| 16 | ∞ | 15.00 | 1.51633 | 64.1 |
| 17 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 9 | 0.00 | $-0.1048 \times 10^{-3}$ | $-0.5448 \times 10^{-6}$ | $-0.3194 \times 10^{-8}$ |
| 14 | 0.00 | $0.5578 \times 10^{-4}$ | $0.1303 \times 10^{-5}$ | $0.5122 \times 10^{-7}$ |

[Embodiment 4]

Figure 13:
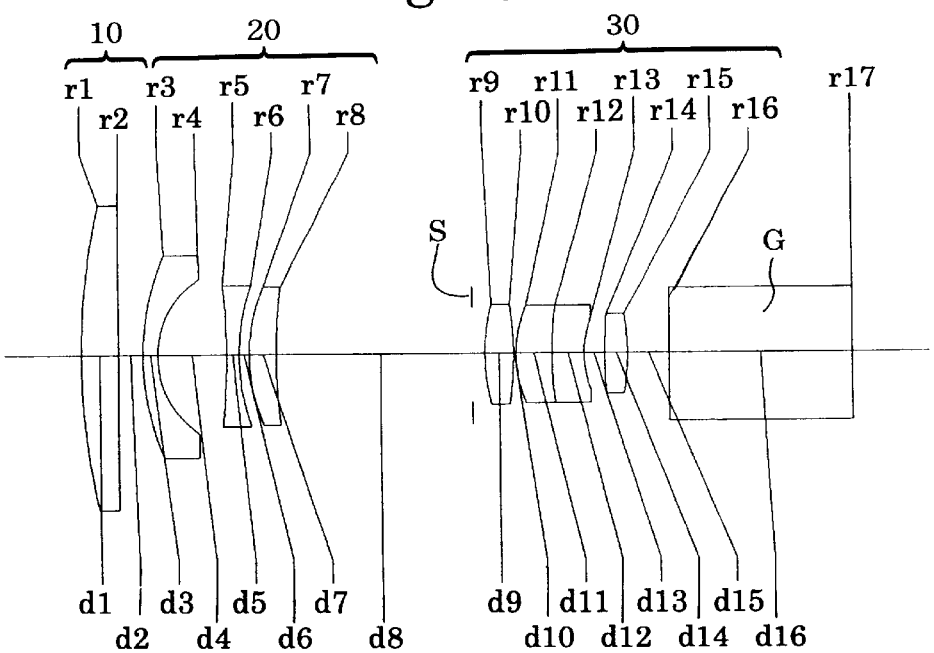
FIG. 13 is a lens arrangement of a fourth embodiment of a zoom lens system according to the present invention.

FIG. 13 is a lens arrangement of the fourth embodiment of a zoom lens system according to the present invention. FIGS. 14A through 14D show aberration diagrams of the lens arrangement of FIG. 13 at the short focal length extremity. FIGS. 15A through 15D show aberration diagrams of the lens arrangement of FIG. 13 at an intermediate focal length. FIGS. 16A through 16D show aberration diagrams of the lens arrangement of FIG. 13 at the long focal length extremity. Table 4 shows the numerical data thereof. The basic lens arrangement is the same as the first embodiment. In this embodiment, miniaturization of the zoom lens system can be attained by reducing a zoom ratio to 2.5. In the third lens group 30, on the object-side surface of the most object-side positive lens element, an aspherical surface, on which a positive power is weakened according to an increase of a distance from the optical axis, is formed.

TABLE 4

$F_{NO}$ = 1:2.8–3.3–4.2
f = 8.50–13.50–21.00 (Zoom Ratio: 2.47)
W = 34.4–22.3–14.7
$f_B$ = 13.32–17.49–24.49 (=(3.43–7.60–14.60) + (15.00/1.51633))

| Surface No. | r | d | Nd | ν |
|---|---|---|---|---|
| 1 | 56.860 | 3.00 | 1.48749 | 70.2 |
| 2 | ∞ | 2.00–6.10–4.81 | — | — |
| 3 | 21.285 | 1.20 | 1.77250 | 49.6 |
| 4 | 7.768 | 5.61 | — | — |
| 5 | -59.976 | 1.00 | 1.81600 | 46.6 |
| 6 | 17.500 | 0.83 | — | — |
| 7 | 14.434 | 2.21 | 1.84666 | 23.8 |
| 8 | 51.581 | 15.98–7.72–2.00 | — | — |
| Diaphragm | ∞ | 1.00 | — | — |
| 9* | 15.595 | 2.36 | 1.58913 | 61.2 |
| 10 | -24.261 | 0.19 | — | — |
| 11 | 9.692 | 2.96 | 1.48749 | 70.2 |
| 12 | 28.962 | 2.61 | 1.84666 | 23.8 |
| 13 | 7.483 | 1.76 | — | — |
| 14 | 39.912 | 1.88 | 1.58913 | 61.2 |
| 15 | -19.385 | 3.43–7.60–14.60 | — | — |
| 16 | ∞ | 15.00 | 1.51633 | 64.1 |
| 17 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 9 | 0.00 | $-0.9841 \times 10^{-4}$ | $-0.1984 \times 10^{-6}$ | $-0.3640 \times 10^{-8}$ |

[Embodiment 5]

FIG. 17 is a lens arrangement of the fifth embodiment of a zoom lens system according to the present invention. FIGS. 18A through 18D show aberration diagrams of the lens arrangement of FIG. 17 at the short focal length extremity. FIGS. 19A through 19D show aberration diagrams of the lens arrangement of FIG. 17 at an intermediate focal length. FIGS. 20A through 20D show aberration diagrams of the lens arrangement of FIG. 17 at the long focal length extremity. Table 5 shows the numerical data thereof. The arrangements of the first and third lens groups are the same as those of the first embodiment. On the other hand, in the second lens group 20, the second lens element and the third lens element are constituted as a cemented sub-lens group. The zoom lens system as a whole has a zoom ratio of about 3. In the third lens group 30, aspherical surfaces are provided on the object-side surface of the most object-side positive lens element, and on both surfaces of the most image-side positive lens element. The aspherical surfaces, on which a positive power is weakened according to an increase of a distance from the optical axis, are formed on the object-side surface of the most object-side positive lens element, and on the image-side surface of the most image-side positive lens element.

TABLE 5

$F_{NO}$ = 1:2.6–3.0–3.9
f = 8.50–14.50–25.00 (Zoom Ratio: 2.94)
W = 34.4–20.7–12.3
$f_B$ = 14.81–18.54–25.94 (=(4.92–8.65–16.05) + (15.00/1.51633))

| Surface No. | r | d | Nd | ν |
|---|---|---|---|---|
| 1 | 47.333 | 3.88 | 1.48749 | 70.2 |
| 2 | ∞ | 2.00–10.46–12.38 | — | — |
| 3 | 30.850 | 1.20 | 1.88300 | 40.8 |
| 4 | 9.204 | 6.69 | — | — |
| 5 | -33.783 | 1.00 | 1.54814 | 45.8 |
| 6 | 10.269 | 3.82 | 1.72825 | 28.5 |
| 7 | 226.589 | 23.51–11.31–1.99 | — | — |
| Diaphragm | ∞ | 1.00 | — | — |
| 8* | 15.330 | 2.34 | 1.65160 | 58.5 |

TABLE 5-continued

| | | | | |
|---|---|---|---|---|
| 9 | −91.099 | 0.10 | — | — |
| 10 | 9.391 | 3.01 | 1.48749 | 70.2 |
| 11 | 35.534 | 1.84 | 1.84666 | 23.8 |
| 12 | 9.347 | 1.90 | — | — |
| 13* | 48.659 | 1.79 | 1.58913 | 61.2 |
| 14* | −32.597 | 4.92–8.65–16.05 | — | — |
| 15 | ∞ | 15.00 | 1.51633 | 64.1 |
| 16 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 8 | 0.00 | $-0.2497 \times 10^{-4}$ | $-0.1022 \times 10^{-6}$ | — |
| 13 | 0.00 | $-0.1051 \times 10^{-3}$ | $0.1053 \times 10^{-4}$ | $-0.5340 \times 10^{-7}$ |
| 14 | 0.00 | $0.8322 \times 10^{-4}$ | $0.1213 \times 10^{-4}$ | — |

[Embodiment 6]

Figure 21:
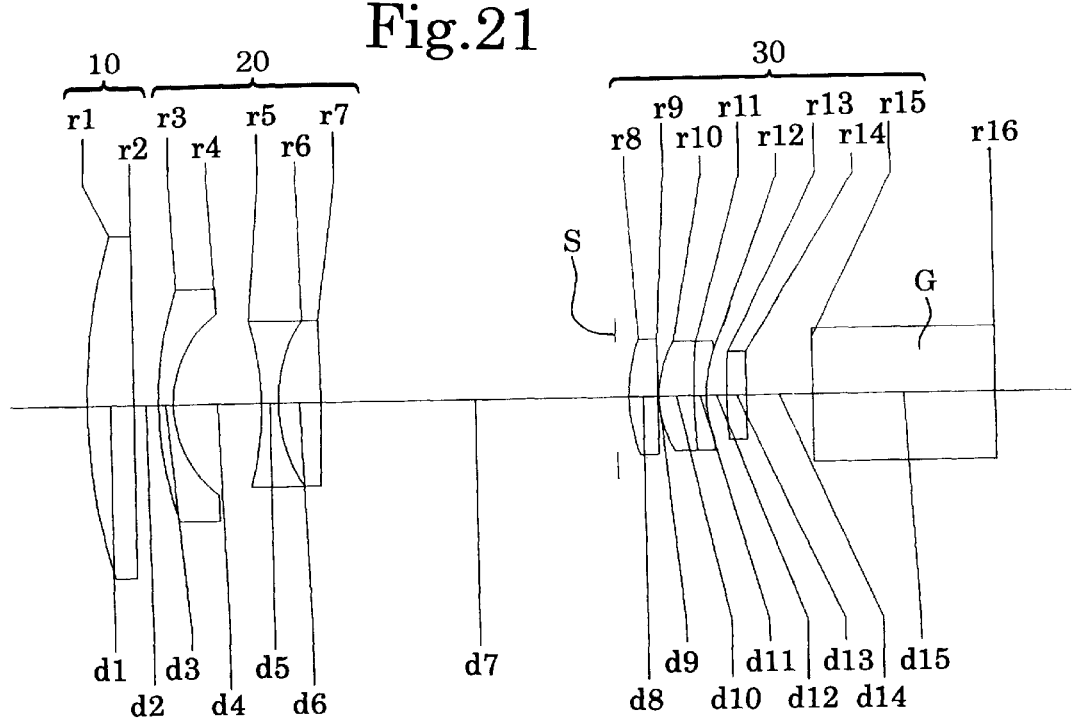
FIG. 21 is a lens arrangement of a sixth embodiment of a zoom lens system according to the present invention.
Figure 22A:
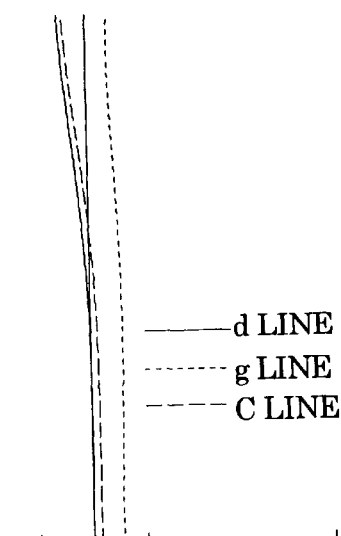
FIGS. 22A, 22B, 22C and 22D show aberration diagrams of the lens arrangement of FIG. 21 at the short focal length extremity.
Figure 22B:
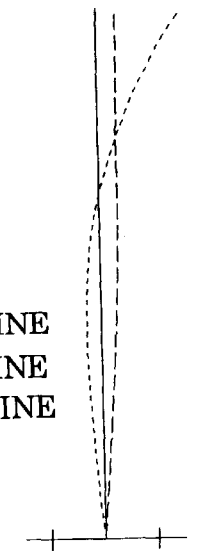
Figure 22C:
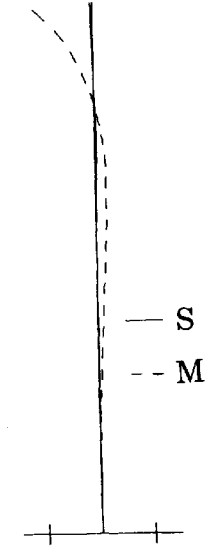
Figure 22D:
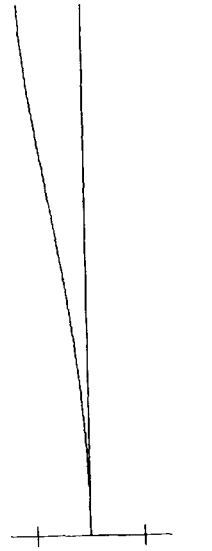

FIG. 21 is a lens arrangement of the sixth embodiment of a zoom lens system according to the present invention. FIGS. 22A through 22D show aberration diagrams of the lens arrangement of FIG. 21 at the short focal length extremity. FIGS. 23A through 23D show aberration diagrams of the lens arrangement of FIG. 21 at an intermediate focal length. FIGS. 24A through 24D show aberration diagrams of the lens arrangement of FIG. 21 at the long focal length extremity. Table 6 shows the numerical data thereof. The basic lens construction is the same as the fifth embodiment. Aspherical surfaces are formed on both sides of the most image-side positive lens element only. The aspherical surface, on which a positive power is weakened according to an increase of a distance from the optical axis, is formed on the image-side of the most image-side positive lens element.

TABLE 6

$F_{NO} = 1:2.6–3.0–3.9$
f = 8.50–14.50–25.00 (Zoom Ratio: 2.94)
W = 34.5–20.7–12.3
$f_B$ = 15.35–19.03–26.21 (=(5.46–9.14–16.32) + (15.00/1.51633))

| Surface No. | r | d | Nd | ν |
|---|---|---|---|---|
| 1 | 50.454 | 3.81 | 1.48749 | 70.2 |
| 2 | ∞ | 2.00–10.96–13.34 | — | — |
| 3 | 29.491 | 1.20 | 1.88300 | 40.8 |
| 4 | 9.564 | 7.23 | — | — |
| 5 | −24.821 | 1.38 | 1.64769 | 33.8 |
| 6 | 12.727 | 3.45 | 1.84666 | 23.8 |
| 7 | −157.452 | 24.20–11.56–2.00 | — | — |
| Diaphragm | ∞ | 1.00 | — | — |
| 8 | 13.589 | 2.37 | 1.67000 | 57.4 |
| 9 | −1074.898 | 0.10 | — | — |
| 10 | 8.807 | 2.89 | 1.48749 | 70.2 |
| 11 | 51.189 | 1.00 | 1.84666 | 23.8 |
| 12 | 10.755 | 1.69 | — | — |
| 13* | 63.478 | 1.61 | 1.58913 | 61.2 |
| 14* | −75.906 | 5.46–9.14–16.32 | — | — |
| 15 | ∞ | 15.00 | 1.51633 | 64.1 |
| 16 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 13 | 0.00 | $0.1187 \times 10^{-4}$ | $0.1976 \times 10^{-4}$ | $-0.1868 \times 10^{-6}$ |
| 14 | 0.00 | $0.3778 \times 10^{-3}$ | $0.2325 \times 10^{-4}$ | — |

Table 7 shows the numerical values of each condition for each embodiment.

TABLE 7

| | Embod. 1 | Embod. 2 | Embod. 3 | Embod. 4 | Embod. 5 | Embod. 6 |
|---|---|---|---|---|---|---|
| Cond.(1) | 0.086 | 0.066 | 0.071 | 0.073 | 0.088 | 0.082 |
| Cond.(2) | 0.816 | 0.912 | 0.833 | 0.897 | 0.931 | 0.961 |
| Cond.(3) | 2.164 | 2.082 | 1.715 | 2.124 | 2.163 | 2.158 |
| Cond.(4) | 0.729 | 1.633 | 1.420 | 1.295 | 1.005 | 0.819 |
| Cond.(5) | 1.591 | 1.557 | 1.521 | 1.555 | 1.576 | 1.582 |
| Cond.(6) | 62.3 | 65.3 | 67.2 | 64.2 | 63.3 | 62.9 |
| Cond.(7) | 0.742 | 0.482 | 0.708 | 0.825 | — | — |
| Cond.(8) | — | — | — | — | 0.828 | 0.668 |
| Cond.(9) | 0.089 | 0.067 | 0.041 | 0.032 | 0.156 | 0.162 |

As can be understood from Table 7, each embodiment satisfies each condition. Furthermore, as can be understood from the aberration diagrams, the various aberrations are adequately corrected.

According to the present invention, a zoom lens system, having the following features, to be used in small-sized video and digital cameras and the like, can be obtained:
   a zoom ratio of 2.5 to 4.0;
   a half angle-of-view of about 35° at the short focal length extremity;
   an image forming performance suitable for an image pick-up device having a high resolution;
   a longer back focal distance; and
   a shorter overall length.

What is claimed is:

1. A zoom lens system comprising a positive first lens group, a negative second lens group, and a positive third lens group, in this order from an object;
   wherein zooming is performed by moving said second lens group and said third lens group; and
   wherein said zoom lens system satisfies the following conditions:

$0.0 < Fw/f1 < 0.15$ $0.75 < |f2/f1| < 1.0$ $1.65 < LD/Ft < 2.25$ wherein
      Fw designates the focal length of the entire lens system at the short focal length extremity;
      Ft designates the focal length of the entire lens system a the long focal length extremity;
      f1 designates the focal length of said first lens group;
      f2 designates the focal length of said second lens group;
      f3 designates the focal length of said third lens group; and
      LD designates the distance, at the short focal length extremity, from the most object-side surface of said first lens group to the most image-side surface of said third lens group.

2. The zoom lens system according to claim 1, wherein said third lens group comprises a three-sub-lens-group lens system of four lens elements;

wherein said sub-lens groups comprise a positive lens element, a cemented sub-lens group having a positive lens element and a negative lens element, and a positive lens element, in this order from said object; and wherein said third lens group satisfies the following conditions:

$$0.5 < R1/R2 < 2.0$$

$$N3 < 1.7$$

$$v3 > 50$$

wherein

R1 designates the radius of curvature of the object-side surface of said cemented sub-lens group in said third lens group;

R2 designates the radius of curvature of the image-side surface of said cemented sub-lens group in said third lens group;

N3 designates the averaged refractive index of said positive lens elements in said third lens group; and v3 designates the averaged Abbe number of said positive lens elements in said third lens group.

3. The zoom lens system according to claim 1, wherein said third lens group comprises a positive lens element having at least one aspherical surface on which a positive power is weakened according to an increase of a distance from the optical axis.

4. The zoom lens system according to claim 1, wherein said second lens group comprises a three-sub-lens-group lens system of three lens elements;

wherein said sub-lens groups comprise a negative meniscus lens element having a convex surface facing toward said object, a negative biconcave lens element, and a positive lens element having a sharp convex surface facing toward said object, in this order from said object; and wherein said second lens group satisfies the following condition:

$$0.4 < Rp/Rn < 1.0$$

wherein

Rp designates the radius of curvature of the object-side surface of said positive lens element in said second lens group; and Rn designates the radius of curvature of the image-side surface of said negative biconcave lens element in said second lens group.

5. The zoom lens system according to claim 1, wherein said second lens group comprises a two-sub-lens-group lens system of three lens-elements;

wherein said sub-lens groups comprise a negative meniscus lens element having a convex surface facing toward said object, a cemented sub-lens group comprising a negative biconcave lens element and a positive lens element having a sharp convex surface facing toward said object, in this order from said object; and wherein said second lens group satisfies the following condition:

$$0.6 < Fw/Rc < 0.9$$

wherein

Rc designates the radius of curvature of the cemented surface of said cemented sub-lens group in said second lens group.

6. The zoom lens system according to claim 1, wherein said second lens group is arranged to be a focusing lens group which is made moveable along the optical axis to obtain an in-focus state for said object, wherein said second lens group satisfies the following condition:

$$|(m2w-m2t)/m2w| < 0.2$$

wherein m2w designates a transverse magnification, at the short focal length extremity, of said second lens group when said zoom lens system is focused at infinity; and m2t designates a transverse magnification, at the long focal length extremity, of said second lens group when said zoom lens system is focused at infinity.

* * * * *